United States Patent [19]

Kimura et al.

[11] 3,899,480

[45] Aug. 12, 1975

[54] SHAPED POLYSACCHARIDE ARTICLES AND A METHOD FOR PRODUCING THEM

[75] Inventors: Hiroshi Kimura, Kyoto; Kensuke Kusakabe, Osaka; Katsuhiko Tokuda, Osaka; Masaru Miyawaki, Osaka; Hiromi Nakatani, Kyoto, all of Japan

[73] Assignee: Takeda Chemical Industries, Ltd., Japan

[22] Filed: Dec. 29, 1971

[21] Appl. No.: 213,740

[30] Foreign Application Priority Data

Dec. 29, 1970 Japan.............................. 45-128940

[52] U.S. Cl............... 260/209 R; 426/104; 426/167
[51] Int. Cl................................................ C07g 3/00
[58] Field of Search............ 264/186, 86; 195/31 P; 99/129; 260/209 R

[56] References Cited

UNITED STATES PATENTS

| 3,301,848 | 1/1967 | Halleck | 195/31 P |
| 3,362,831 | 1/1968 | Szczesniak | 99/131 |
| 3,447,940 | 6/1969 | Halleck | 260/209 R |
| 3,507,290 | 4/1970 | Halleck | 260/209 R |

FOREIGN PATENTS OR APPLICATIONS

| 847,431 | 4/1960 | United Kingdom | 264/186 |

OTHER PUBLICATIONS

"Production of a Firm Resilient Gel-Forming Polysaccharide by a Mutant of *Alcaligenes faecalis* var. *myxogenes*" 10C3, Agr. Biol. Chem., Vol. 30, No. 2, 196–198, 1966.

*Primary Examiner*—Johnnie R. Brown
*Attorney, Agent, or Firm*—Wenderoth, Lind & Ponack

[57] ABSTRACT

The present invention relates to the production of shaped polysaccharide articles by the treatment of specific thermally gelable polysaccharides with specific solubilizing agents and subsequent removal of said solubilizing agents by diffusion or neutralization to effect gelation in a predetermined form.

2 Claims, No Drawings

SHAPED POLYSACCHARIDE ARTICLES AND A METHOD FOR PRODUCING THEM

This invention relates to shaped polysaccharide articles and a method for producing them.

Heretofore, the thermally gelable polysaccharides predominantly composed of β-1,3-glucose units, have been utilized as a food material or a food additive. However, in order to gel and mold these polysaccharides, it was considered necessary to suspend the polysaccharides in, for example, water, aqueous alcohol or water containing propylene glycol and heat the resulting suspension at a temperature of not less than about 60°C. Therefore, the prior processes invariably involved heating as an indispensable treatment. However, this heat gelation treatment resulted in various disadvantages. Namely, the articles obtained by this process lose their thermal gelability and do not lend themselves to further heat-sealing process, nor swell upon immersion in water. Besides, by heating process, it was technically difficult to produce articles of intricate shapes on a large scale.

Under these circumstances, the present inventors conducted an extensive study and have found that when said thermally gelable polysaccharides are dissolved in a solution containing a certain solubilizing reagent and then, the solubilizing reagent is decreased, the polysaccharides are allowed to gel without heating.

The present invention is a culmination of the above findings. Thus, the present invention relates to a shaped polysaccharide articles and the process for their production, which comprises; while keeping at a temperature not higher than 60°C throughout the process, dissolving 1 to 10% (weight/volume) of a polysaccharide, which is thermally gelable in a concentration of not lower than 1% (weight/volume) and mainly consists of β-1,3-glucose units, in a solution containing a solubilizing reagent selected from sodium hydroxide, potassium hydroxide, barium hydroxide, thiocyanate, (e.g., ammonium thiocyanate, potassium thiocyanate, calcium thiocyanate, sodium thiocyanate, barium thiocyanate), calcium chloride, trisodium phosphate and zinc chloride; then decreasing the amount of said solubilizing reagent in the solution by diffusion or neutralization, thereby allowing the polysaccharide to gel in a predetermined form.

Production of Polysaccharide

The thermally gelable polysaccharides mentioned above can be obtained, for instance, by cultivating a microorganism belonging to the genus Alcaligenes or Agrobacterium in a medium containing glucose as a carbon source, and are recovered therefrom as a white or off-white powder in a dehydrated and dried form. Glucose is the main constituent sugar of polysaccharide, and, in infrared analysis, the powders exhibit properties characteristic of a polysaccharide and have an absorption characteristic of β-linkage at 890 cm$^{-1}$. In addition, the polysaccharides exhibit very unique behavior.

Thus, they swell and gelate when poured in to water and heated. For example, when suspended in water to a concentration of about 1% and heated, these polysaccharides form the gel which is thermally irreversible and not suspended upon addition of water. The gel strength of the polysaccharides is between $470 \times 10^3$ to $1,300 \times 10^3$ dyne/cm$^2$ when measured under following conditions. A 2.0 g. sample is made up with pure water to 100 ml. and homogenized by means of a mixer for 5 minutes. The resulting suspension is transferred to a test tube of 15 mm. in diameter, which is degassed to remove bubbles under a reduced pressure of not higher than 10 mmHg, followed by heating in a boiling water bath for 10 minutes. Then, it is cooled with a cold water for 10 minutes and allowed to stand at room temperature for 30 minutes. The gel is taken out from the tube and cut into 1.0 cm thick disc, with the uppermost layer being discarded. The pressure resistance of the gel disc against the cylinder (5.6 mm. in diameter) of curd tension meter just before the cylinder breaks into the disc is measured and recorded in terms of a dyne scale. The resistance value recorded is taken as the gel strength of the specimen.

The microorganisms of the genus Alcaligenes which are capable of producing the indicated polysaccharides include, for example, *Alcaligenes faecalis var myxogenes* NTK-*u* (ATCC 21680), a mutant strain which is obtained upon treatment of parent strain K with N-methyl-N-nitro-N-nitrosoguanidine, (a strain capable of producing polysaccharide "PS-B") and *Alcaligenes faecalis var myxogenes K* (a strain capable of producing polysaccharide "Curdlan," See Agricultural Biological Chemistry, vol 30, pages 196 et seq. (1966) by Harada et al. The pertinent microorganisms of the genus Agrobacterium include such strains as ATCC 21079 and IFO 13127 which have been identified as *Agrobacterium radiobacter* and capable of producing polysaccharide PS-A. "IFO" denotes the deposit number of Institute for Fermentation, Osaka, Japan.

For the production of objective polysaccharides, these microorganisms are incubated in a medium which contains assimilable carbon sources (e.g. glucose, sucrose, sorbitol, dextrin, starch hydrolyzates, organic acids) digestible nitrogen sources (e.g., inorganic ammonium salts, nitrates, organic nitrogen sources such as yeast extract, corn steep liquor, corn gluten, soy bean meal) inorganic salts (e.g., salts of manganese, iron, magnesium, calcium, zinc, cobalt). If desired, such trace growth promoters as vitaminaceous materials, nucleic acid-related compounds and so forth may be incorporated in the culture medium. In case of cultivation of said strain NTK-*u*, it is necessary to incorporate 50 to 1000 μg/ml of uracil in the medium.

Although the preferred cultural conditions vary with different microorganisms employed, cultivation of the main culture for the production of said polysaccharides is generally effected at pH about 5 to 8 at a temperature of 20° to 35°C for 2 to 4 days, using such cultivation means as shake culture or submerged culture.

As the polysaccharides thus produced usually occur predominantly extracellularly, advantage may be taken, in order to recover them, of combination of the techniques which are per se known means for separation and purification of polysaccharides. By way of illustration, there may be employed such techniques as dissolution, filtration, precipitation (e.g., by neutralization, salting out or the like), desalting (e.g., by permselective dialysis, reverse deionization or the like), liquid-solid separation (e.g., by compression, centrifugation or the like), drying (e.g., by spray-drying, lyophilization or the like), powdering, etc.

Some examples for the production of polysaccharides are shown below.

EXAMPLE A-1

A loopful of a slant culture of *Agrocbacterium radiobacter* (IFO 13127) is inoculated in 30 ml. of an aqueous culture medium charged in a 200 ml.-flask, the medium being composed of glucose (5%), $(NH_4)_2HPO_4$ (0.1%), yeast extract (0.5%), $KH_2PO_4$(0.1%), $MgSO_4\cdot7H_2O$ (0.05%), $FeSO_4\cdot7H_2O$ (0.005%), $MnSO_4\cdot7H_2O$ (0.002%), $ZnCl_2$ (0.001%), $CoCl_2$ (0.001%) and water and being adjusted at pH 7.2. Cultivation is effected under shaking at 28°C for 4 days.

The resulting viscous broth is centrifuged at 10,000 rpm. for 20 minutes to separate a sediment from a supernatant liquid. To the sediment is added an aqueous 0.5N-NaOH solution, followed by thorough stirring to completely dissolve the polysaccharide portion of the sediment. The solution is then centrifuged again at 10,000 rpm. for 20 minutes to remove the cells. The solution is neutralized with a 12% aqueous HCl solution, whereupon the desired polysaccharide separates out as a gel. This gel fraction is collected by centrifugation at 2,000 rpm. for 10 minutes, and washed twice or three times with water, followed by dehydration with acetone and drying, to give 420 mg. of PS-A.

On the other hand, to the supernatant obtained by centrifugation of the culture broth is added its four-fold volume of acetone. The resulting precipitates are collected and dried to give 120 mg. of polysaccharide PS-A Specific rotation:
 $-17° \pm 3°$ (C=1.0, dimethylsulfoxide)
 $+33° \pm 6°$ (C=1.0, 0.1N-NaOH)

Elementary analysis (%): Calculated for $C_6H_{10}O_5$: C,44.44; H,6.17. Found: C,43.28±1%; H,6.20 ± 0.5; N=0.00.

gel strength: $650 \times 10^3$ to $1,300 \times 10^3$ dyne/cm$^2$

EXAMPLE A-2

*Alcaligenes faecalis var. myxogenes* Strain NTK-u (ATCC 21680) is inoculated in 30 ml. of a seed culture medium charged in a 200 ml.-Erlenmyer flask, the medium being composed of glucose (1.0%), $(NH_4)_2HPO_4$ (0.15%), $KH_2PO_4$ (0.1%), $MgSO_4\cdot7H_2O$ (0.05%), $FeSO_4\cdot7H_2O$ (0.005%), $MnSO_4\cdot7H_2O$ (0.002%), $SnCl_2$ (0.001%), $CoCl_2$ (0.001%), yeast extract (0.1%), $CaCO_3$ (0.3%), uracil (0.01%) and water and being adjusted at pH 7.0. Cultivation is effected under shaking at 32°C for 24 hours.

A 2 ml.-portion of the resultant seed culture broth is inoculated in 20 ml. of a main culture medium charged in a 200 ml.-creased Erlenmeyer flask, the medium being composed of glucose (10.0%), $(NH_4)_2HPO_4$ (0.23%), $KH_2PO_4$ (0.1%), $MgSO_4\cdot7H_2O$ (0.05%), $FeSO_4\cdot7H_2O$ (0.005%), $MnSO_4\cdot7H_2O$ (0.002%), $ZnCl_2$(0.001%), $CoCl_2$ (0.001%), $CaCO_3$ (0.3%), uracil (0.01%) and water and being adjusted at pH 7.0. Cultivation is carried out under shaking at 32°C for 90 hours.

The broths thus obtained in several such flasks are pooled. To 80 ml. of the broth is added 240 ml. of an aqueous 0.5N—NaOH solution, followed by thorough stirring until the produced polysaccharide is dissolved. To the mixture is added 160 ml. of water. The diluted solution is centrifuged at 12,000 rpm. for 10 minutes to remove the solid matters including the cells. The supernatant liquid is neutralized with 3N-HCl, whereupon gel sediments separate. The sediments are collected by centrifugation and washed with water until the salts contained therein are removed. Then, the sediments are again centrifuged to collect the desired polysaccharide PS-B. Dehydration with acetone and drying under reduced pressure yield 4.4 g. of PS-B. The yield relative to the substrate glucose is 55%.

Specific rotation:
 $-16° \pm 3°$ (C=0.5, dimethylsulfoxide)
 $+31° \pm 6°$ (C=1.0, 0.1N-NaOH)

Elementary analysis (%): Calculated for $C_6H_{10}O_5$: C,44.44; H,6.17. Found: C,43.58 ± 1; H,6.46 ± 0.5; N=0.00.

gel strength:
 $650 \times 10^3$ to $1,300 \times 10^3$ dyne/cm$^2$

EXAMPLE A-3

*Alcaligenes faecalis var. myxogenes K* is cultivated in the same manner as in Example A-1 and the resulting broth is centrifuged. To thus obtained sediment is added an aqueous 0.5N—NaOH solution to dissolve the polysaccharide portion of the sediment. The solution is neutralized, whereupon polysaccharide "curdlan" separates out.

Specific rotation:
 $-18°$ (0.1N NaOH)

Elementary analysis (%): C,43.55; H,6.05; O,48.39, N and other minor components 2.01 gel strength: $470 \times 10^3$ to $500 \times 10^3$ dyne/cm$^2$

The gel strength in Examples A-1 to A-3 was measured as mentioned before.

Conditions for the production of shaped polysaccharide articles

In the present invention, the said polysaccharides are first dissolved in a solution containing a solubilizing agent. As the reagent, there may be preferably employed strong alkalis such as sodium hydroxide, potassium hydroxide, barium hydroxide, etc., thiocyanates, such as ammonium thiocyanate, potassium thiocyanate, calcium thiocyanate, sodium thiocyanate, barium thiocyanate, etc.; calcium chloride; trisodium phosphate; and zinc chloride.

Desirably the solubilizing reagent is previously dissolved in water in a concentration indicated below. Thus, in the case of strong alkalis such as sodium hydroxide, etc., 0.01% (weight/volume) to saturated aqueous solutions, preferably 0.05 to 5% (weight-/volume) aqueous solutions, are suitable. In the case of thiocyanates such as ammonium thiocyanate, potassium thiocyanate, etc., 25% (weight/volume) to saturated aqueous solutions, preferably 25 to 50% (weight-/volume) aqueous solutions and most advantageously 40 to 50% (weight/volume) aqueous solutions are advantageous. In the case of calcium chloride and zinc chloride, 30% (weight/volume) to saturated aqueous solutions, preferably 30 to 50% (weight/volume) aqueous solutions are desirable and in case of trisodium phosphate, 0.5% (weight/volume) to saturated solutions are advantageous. When an aqueous solution of said strong alkali is used as a solvent, the polysaccharides are dissolved understrongly alkaline conditions at a pH over 10.5 and in such a case, the solution may be conveniently prepared by taking the pH of the system as an indicator.

In such an aqueous solution is dissolved the polysaccharides in a proportion of about 1 to 10% (weight- /volume) and the mixture is evenly stirred to obtain the desired solution.

In a proportion less than 1% (weight/volume), the viscosity of the materials obtained by the following neutralization or diffusion becomes a little too low to form a good product. On the other hand, in a proportion over 10%, the material can hardly form shaped articles.

When the polysaccharides are dissolved in an aqueous solution of any of the above mentioned solubilizing reagents, the hydrogen bonds of the polysaccharides are easily ruptured to give a solution having a suitable viscosity.

Secondly, the solubilizing reagents in the solution are decreased or removed. For this purpose, such means are diffusion (dialysis, washing, etc.) and neutralization of the solubilizing reagents are employed. Dialysis is one of the expedient means. As dialytic membranes, bladders are prepared from such materials as cellophane, cellulose acetate, fish stomachs, swine bladders, etc., and after the above solution is dispersed into those bladders, the latter are sealed and immersed in water, whereupon the solubilizing reagent is dialytically removed and, accordingly, gel articles are formed in conformity with the shapes of the bladders.

Since the polysaccharides solution has a comparatively high viscosity even at a low concentration, the solution may be directly immersed in water.

In this case, the solution starts gelling rapidly at the interface. The solubilizing agent may be removed to a suitable degree according to the purpose, object, processing method and other factors.

However, when the solubilizing reagent is a strong alkali such as sodium hydroxide, it is not advantageous to remove the reagent by the above diffusion procedures, for the polysaccharides remain dissolved even at a low alkali concentration. In such instances, it is advantageous to convert the solubilizing reagent to a different compound, for example, by neutralization. Thus, when an alkali solution of the polysaccharides is placed in an acidic solution, such as hydrochloric acid, the neutralization reaction immediately takes place and the entire alkali is converted to the corresponding salt. The salt thus formed can be easily removed by washing with water.

The acid which is to be used for the above neutralization treatment is not limited to any particular acid but may be any organic or inorganic acid, only if it is used in a sufficient concentration to neutralize the alkali contained in the solution. However, hydrochloric acid is particularly desirable in view of the ease of washing after the gelation. To impart a taste to the gel, it is desirable to use an edible organic acid such as acetic acid, citric acid, succinic acid, malic acid, ascorbic acid, lactic acid and the like.

By virtue of the combination of the above means this invention provides excellent results. Since the gelling and molding can be performed without resort to heating which has heretofore been considered an indispensable treatment, the shaped articles obtainable by this invention retain the thermal gelability inherent in the polysaccharides employed and therefore may be further heat-sealed. For this purpose, the temperature is kept at not higher than 60°C. If a heat-treatment is concomitantly carried out in the course of said neutralization or diffusion the thermal gelability of the shaped articles will be lost. However, the resulting articles will be by far superior in qualities to the articles obtainable by the mere heat-gelation according to the conventional art.

The shaped polysaccharide articles according to this invention are edible or non-edible moldings and include elastic, transparent or opaque gels which can be obtained from the above polysaccharides, as well as dried forms of such gels.

Shapes of the articles may be selected as desired, exemplary articles including spherical, ellipsoidal and cubic articles, as well as the articles of more complicate shape like a strawberry, banana, jelly-fish, sea-cucumber, film, tubing, noodles, cluster of grapes, etc.

Edible shaped articles may, for example, be edible films, edible tubes, grape-shaped foods, noodle-shaped foods, etc., and non-edible shaped articles may be packaging film, packaging tube, horticultural dry gels containing fertilizers for the cultivation of plants, vari-shaped gel toys, etc., gel ornaments, decorations, etc., which are usable even in water.

After all, the shaped articles according to this invention are composed of the polysaccharides which are tasteless, odorless and non-toxic. The polysaccharide articles are insoluble in water and hot water and do not undergo any deformation even when heated in boiling water. In addition, if the resulting gel is dipped in a solution containing a pigment, condiment, flavor or/and medicament and, then, air-dried, there is obtained a dry gel containing such additives.

This air-dry gel is reversible, that is to say, it swells upon immersion in water, reverting to the original gel stage. Therefore, this invention is applicable to varieties of uses.

In the gelling process according to this invention, the polysaccharides may be used in combination with such alkali-soluble materials as starch and proteins. Aside from those materials, alkali-insoluble substances may likewise be used in conjunction only if they are stable against alkalies and acids. Therefore, it is possible to incorporate, as required, various additives and natural products such as flavors, spices, coloring agents, etc. The concomitant use of starch or dextrin gives a more delicate mouth-feeling. It should be noted, however, that if the total amount of such additives exceeds 80% (weight) on a solid basis of the combined amount of the polysaccharide and additives, the desired gelation will be hardly obtainable.

The incorporation of water-soluble additives is undesirable, for they will diffuse out in the course of gelling or subsequent washing. To obviate such results, a gel composed solely of the polysaccharides is prepared and then, the gel is immersed in a solution containing the desired water-soluble substance and dried. Alternatively, dry sheets of the polysaccharides alone are first prepared. Then, the desired substance is sandwiched between two such sheets and the assembly is heat-sealed. In other words, a gel of the polysaccharides is first prepared and, then, the desired water-soluble substance is added in a suitable manner.

Such procedures are particularly suited for the production of the horticultural dry gels containing water-soluble nutrients for the cultivation of ornamental flowers and the dry gels containing the so-called hot-spring medicaments for bath-water use.

To manufacture an edible film according to this invention, the polysaccharides are dissolved in a solution of sodium hydroxide and the solution is degassed under reduced pressure. The resulting polysaccharide solution is spread in a thin, flat layer on a suitable plate and neutralized in 1% (weight/volume) hydrochloric acid. The resulting gel film is washed with water to remove the salt and dried at a low temperature in a suitable manner. The above procedure yields a heat-sealable, edible film.

If the alkali solution of polysaccharides prepared in the above manner is extruded through a slit or annular nozzle into an acidic solution, a plate-like or tubular article will be obtained.

The above technique is applicable to the production of non-edible film and, in this application, there is available a broader range of solubilizing reagents to choose. For instance, the polysaccharides are dissolved in an aqueous thiocyanate solution and the solution is spread in a thin, flat layer on a plate. Then, the plate is immersed in water, whereupon the thiocyanate diffuses out into water and simultaneously, the polysaccharides start gelling. The solvent in the mass of gel is replaced by water and therefore, the washing step may be dispensed with. In this manner, a film can be manufactured more easily than by the above alkali dissolution. In addition, by extruding the solution through an annular or slit-type nozzle in the above manner, an annular or plate-like article can be manufactured.

The edible or non-edible film which can thus be manufactured by the process of this invention is transparent and glossy besides being too heat-resistant to be deformed or degraded when put in boiling water.

When a commercial grade of natural butter is wrapped in this film and stored in an incubator at 35°C (a filter paper is spread beneath the film and the degree of oozing of melted butter is observed), no diffusion of butter is observed even after 7 days. Thus, the film according to this invention is oil-proof. The permeability of moisture and non-permeability of oxygen of this film are comparable to those of cellophane (See table 2).

Furthermore, because the film is tasteless, odorless, non-toxic and heat-sealable, it can be used in a broad range of applications.

Compared with the conventional clinical wafer, the edible film of this invention is by far superior in mechanical strength and moisture-proofness.

If the above-described solution of the polysaccharides in a strong alkali is dripped into an acidic solution through a nozzle of a suitable diameter of size, the polysaccharide gels in minute spheres under the influence of a surface tension, giving rise to an edible product resembling fish eggs. Non-edible gels resembling fish eggs can be prepared by dissolving, the polysaccharides in a thiocyanate solution in the above-described manner and dripping the resulting solution into water. Since the gell balls still retain the thermal gelability of the polysaccharides, it is possible to manufacture a product resembling a fish roe, such as a cod's roe or herring's roe by grouping a suitable number of such balls in a cluster and rapidly heating it to obtain a mass in which the individual balls retain their original shape.

If the above strong alkali solution of the polysaccharides is extruded in a filamentary or thread-like shape into an acidic solution and the resulting gel is washed with water and dried, a noodle-shaped food will be obtained.

Since this noodle-shaped food is insoluble in water and hot water, it is suitable for use as a material for so called sauce pan dishes and Chinese-style foods. It will not collapse if boiled.

Incorporation of the above fibrous gel in, for example, a batch for the production of artificial meat will lead to improvement in palatability (feeling of chewing).

As has been explained above, the dried gel article obtainable according to this invention readily swells and reverts to its original wet state upon immersion in water, and the wet gel is not deformed or dissolved even when boiled in water for a long time. Moreover, the process of this invention features such improved molding characteristics that elaborate articles can be easily manufactured. Thus, the utility value of this invention is really significant.

Experiment 1

Selection of solubilizing reagents.

1. Testing procedure

To select suitable solubilizing reagents for the polysaccharides an aqueous solution of each of the solubilizing reagents listed in Table 1 ws prepared. To this solution, the polysaccharides were added in the proportion of 5 weight % and the solubilizing effects were evaluated by naked-eye observation. Then, each of the solution samples was allowed to gel in a suitable manner and the gel strengths were organoleptically compared.

In the case of the solution samples containing to sodium hydroxide, potassium hydroxide, barium hydroxide and formic acid, they were caused to gel by neutralization and the gels were thoroughly washed with water. All other solution samples were caused to gel by washing with water.

2. Test Results

The results of the above test are set forth in Table 1. The solubilizing reagents of this invention, i.e. strong alkalis such as sodium hydroxide, potassium hydroxide, barium hydroxide, etc., calcium chloride, zinc chloride, trisodium phosphate, and thiocyanates such as ammonium thiocyanate, potassium thiocyanate, calcium thiocyanate, sodium thiocyanate, barium thiocyanate, etc., were found to be especially useful.

Table 1

| Solubilizing reagents No. | Type | Concentration of aqueous solution weight% | Solubility | Gel strength |
|---|---|---|---|---|
| 1. | Sodium hydroxide | 0.05 | +++ | +++ |
| 2. | Potassium hydroxide | 0.05 | +++ | +++ |
| 3. | Barium hydroxide | 0.05 | +++ | +++ |
| 4. | Ammonium thiocyanate | 25 | + | ++ |
| 5. | Potassium thiocyanate | 25 | + | ++ |
| 6. | Calcium thiocyanate | 25 | + | ++ |
| 7. | Sodium thiocyanate | 25 | + | ++ |
| 8. | Barium thiocyanate | 25 | + | ++ |
| 9. | Calcium chloride | 30 | + | ++ |
| 10. | Zinc chloride | 30 | + | ++ |
| 11. | Trisodium phosphate | 0.05 | + | ++ |
| 12. | Formic acid | Soluble in pure solution | ++ | + |
| 13. | Dimethylsulfoxide | Soluble in pure solution | ++ | + |
| 14. | Formaldehyde | Soluble in pure solution | ++ | + |
| 15. | Urea | Soluble in saturated solution | + | + |
| 16. | Thiourea | Soluble in saturated solution | + | + |

Table 1-Continued

| Solubilizing reagents No. | Type | Concentration of aqueous solution weight% | Solubility | Gel strength |
|---|---|---|---|---|
| 17. | Potassium iodide | 25 | + | + |
| 18. | Potassium mercuric iodide | 25 | + | + |

(Note) A larger number of 'plus' signs indicates a more satisfactory result.

Experiment 2

1. Testing procedure

To measure the oxygen non-permeability of the film according to this invention, the edible film (20 microns thick) prepared by the procedure set forth in Example 1 hereinafter and control films were subjected to a comparative test. The control films wre polyethylene and cellophane films of the same thickness as above, and, for the measurements, a gas permeability tester manufactured by Toyo Tester Kogyo K.K. was employed. The test film according to this invention was tasteless, odorless, glossy, heat-sealable, and more flexible and flexure-resistant than cellophane film of the same thickness.

2. Test results

The results of the above test are indicated in Table 2. It will be seen that the film of this invention is slightly more permeable to oxygen than cellophane but is more impermeable than polyethylene. Thus, the present film belongs to the general category of hardly impermeable films.

Table 2

| Type Standing time (in minutes) | Polyethylene | Film of this invention | Cellophane |
|---|---|---|---|
| 2 | 0.061 | — | — |
| 4 | 0.121 | — | — |
| 6 | 0.180 | — | — |
| 8 | 0.237 | — | — |
| 10 | 0.286 | 0.120 | 0.072 |
| 12 | 0.366 | — | — |
| 14 | 0.406 | — | — |
| 20 | — | 0.256 | 0.111 |
| 30 | — | 0.334 | 0.132 |
| 40 | — | 0.376 | 0.151 |
| 50 | — | 0.406 | — |
| 60 | — | 0.424 | 0.178 |
| 70 | — | 0.448 | — |
| 80 | — | — | 0.190 |

(Note) Figures in the table are in mg. Hg.

Experiment 3

1. Testing procedure

PS-B was dissolved at various concentrations in a 0.5% NaOH solution. The proper range of the concentrations was judged from the superiority of their molding characteristics upon neutralization.

2. Results

The results are indicated in Table 3 and the most suitable concentration falls within about 1 to 10% (weight/volume)

Table 3

| PS-B(%) | Molding characteristics |
|---|---|
| 0.5 | Viscosity of the alkali solution is a little too low to form a good products |
| 1–10 | Good |
| 11–20 | Viscosity of the alkali solution is too high to form a shaped articles |
| 21– | Hardly forms shaped articles. |

EXAMPLE B-1

To 1 liter of a 0.6 weight % aqueous solution of sodium hydroxide is added 50 g. of the PS-B and the mixture is stirred evenly and, then, degassed under reduced pressure, whereupon a 5% polysaccharide solution is obtained. This transparent viscous solution is spread in a uniform thickness, say 0.1 to 1.0 mm., on a glass plate and neutralized to gel by immersion in a 1% aqueous solution of HCl.

The resulting transparent gel film is taken out from the acid solution, washed well with water and dried at a low temperature in a suitable manner. The above procedure gives about 45 g. of an edible film which is transparent, glossy and heat-sealable.

EXAMPLE B-2

To 1 liter of a 0.1 weight % aqueous solution of sodium hydroxide is added 100 g. of PS-B and the mixture is stirred evenly until the polysaccharide is dissolved. The resulting solution is degassed under reduced pressure, whereupon a 10% polysaccharide solution is obtained. This clear, viscous solution is extruded through an annular nozzle into a 1% aqueous solution of acetic acid, whereby the slurry is neutralized to gel.

The resulting transparent gel tube is taken out from the acid bath and washed well with water. Then, air is introduced into the tubing and the tube in thus-inflated state is dried at a low temperature in a suitable manner. The procedure gives about 90 g. of an edible tube which is suitable for use as sausage casings.

EXAMPLE B-3

Thirty grams of PS-B and 30 grams of amylose are added to 1 liter of a 2 weight % aqueous solution of sodium hydroxide and the mixture is stirred evenly and, then, degassed under reduced pressure to obtain a clear, viscous solution. This solution is spread in a thin, flat layer of uniform thickness on a glass plate and neutralized to gel by immersion in a 1% aqueous solution of HCl.

The resulting translucent gel film is taken out from the acid bath, washed well with water and dried at a low temperature in a suitable manner. The above procedure yields about 54 g. of an edible film which is translucent, glossy and heat-sealable.

EXAMPLE B-4

To 1 liter of a 25 weight % aqueous solution of calcium thiocyanate is added 100 g. of PS-B and the mixture is stirred evenly and, then, degassed under reduced pressure to obtain a 10% polysaccharide solution. This clear, viscous solution is spread in a thin layer of uniform thickness on a glass plate and immersed as such in water. The resulting gel is dried at a low temperature in a suitable manner, whereupon about 90 g. of a film

EXAMPLE B-5

Fifty grams of PS-B and 15 g. of potato starch are added to 1 liter of a 2 weight % solution of sodium hydroxide and the mixture is stirred evenly and, then, degassed under reduced pressure. The resulting viscous solution is dripped through a nozzle having orifices 2 millimeters in diameter into a 5% aqueous solution of HCl, whereby the solution is neutralized to gel. The small gel balls thus obtained are taken out from the acid bath and washed well with water. The procedure gives about 1 kg. of transparent gel balls measuring 3 to 4 mm. in diameter.

A suitable group of those balls is placed in a mold shaped like a fish roe and rapidly heated and cooled. The above procedure gives a roe-shaped gel product in which the individual balls retain their original spherical shape. When this product is dipped in a suitable seasoning fluid, a seasoned roe-shaped (or cluster of grapes-shaped) food is obtained.

EXAMPLE B-6

To 1 liter of a 30 weight % aqueous solution of zinc chloride is added 100 g. of PS-B and the mixture is evenly stirred and, then, degassed under reduced pressure to obtain a 10% polysaccharide solution. This viscous solution is dripped into water through a nozzle having orifices 2 mm. in diameter, whereupon the solution gels into small balls measuring 3 to 4 mm. in diameter. Yield: about 1 kg. This product can be used as a useful carrier in various applications. In typical applications, those balls are dipped in a solution containing water-soluble nutrients or a flavoring material for both medicaments and the balls thus impregnated with such materials are air-dried and put to use.

Upon addition of water, the air-dried gel swells, releases the water-soluble ingredients and reverts to its original gel state.

EXAMPLE B-7

Thirty grams of PS-B and 30 g. of potato starch are added to 1 liter of a 2 weight % aqueous solution of sodium hydroxide and the mixture is evenly stirred and, then, degassed under reduced pressure to obtain a viscous solution. This solution is extruded through a nozzle having orifices 0.5 mm. in diameter into a 5% aqueous solution of HCl, whereupon the solution is neutralized to gel in the form of fibers. The gel fibers are taken out from the acid bath, washed well with water and dried in a suitable manner. The above procedure gives about 54 g. of a noodle-shaped food.

EXAMPLE B-8

Forty grams of PS-A are dissolved in 1 liter of a 1 weight % aqueous solution of sodium hydroxide and the mixture is evenly stirred and, then, degassed, 20 ml. each of the solution is filled into a cellophane tube, 15.9 mm in diameter, and dialyzed for 1 hour in a 4% acetic acid solution to give about 900 g. of a almost transparent and uniform gel. The gel is immersed in a mixed solution of sodium glutamate, NaCl to give a pickle-like food. One centimeter thick disc of the gel food shows $826 \times 10^3$ dyne/cm² in gel strength when measured by curd-tension meter.

EXAMPLE B-9

In the same manner, as in Example B-8, except for polysaccharide employed being curdlan, a pickle-like food is obtained. The gel strength of the food is $635 \times 10^3$ dyne/cm².

What we claim is:

1. A gelled polysaccharide selected from the group consisting of a gelled PS-A, PS-B and Curdlan which is produced by a process comprising: while maintaining a temperature not higher than 60°C throughout the process, dissolving 1 to 10% (weight/volume) of a PS-A, PS-B or Curdlan polysaccharide which is thermally gellable in a concentration of not lower than 1% (weight/volume) and mainly consists of β-1,3-glucose units, in a solution containing 0.05 to 5% (weight/volume) of a solubilizing agent selected from the group consisting of sodium hydroxide, potassium hydroxide and barium hydroxide; then decreasing the amount of said solubilizing reagent in the solution by diffusion, thereby allowing the polysaccharide to gel.

2. A gelled polysaccharide according to claim 1 which is a film.

* * * * *